(12) United States Patent
Nakamura et al.

(10) Patent No.: US 10,511,754 B2
(45) Date of Patent: Dec. 17, 2019

(54) IMAGING APPARATUS, OPTICAL DEVICE, ELECTRONIC DEVICE, VEHICLE, AND IMAGING-DEVICE MANUFACTURING METHOD

(71) Applicant: Nidec Copal Corporation, Tokyo (JP)

(72) Inventors: Yuta Nakamura, Tokyo (JP); Ryo Kikuta, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 6 days.

(21) Appl. No.: 15/500,346

(22) PCT Filed: Jul. 29, 2015

(86) PCT No.: PCT/JP2015/071480
§ 371 (c)(1),
(2) Date: Jan. 30, 2017

(87) PCT Pub. No.: WO2016/017682
PCT Pub. Date: Feb. 4, 2016

(65) Prior Publication Data
US 2017/0223243 A1     Aug. 3, 2017

(30) Foreign Application Priority Data

Aug. 1, 2014 (JP) .................. 2014-158248
Dec. 19, 2014 (JP) .................. 2014-257330
Jan. 29, 2015 (JP) .................. 2015-015724

(51) Int. Cl.
*H04N 5/225* (2006.01)
*G02B 7/00* (2006.01)
*G02B 7/02* (2006.01)

(52) U.S. Cl.
CPC ........... *H04N 5/2254* (2013.01); *G02B 7/003* (2013.01); *G02B 7/021* (2013.01); *G02B 7/025* (2013.01); *G02B 7/026* (2013.01); *H04N 5/2253* (2013.01)

(58) Field of Classification Search
CPC .... H04N 5/2254; H04N 5/2253; G02B 7/026; G02B 7/025; G02B 7/003; G02B 7/021
See application file for complete search history.

(56) References Cited

U.S. PATENT DOCUMENTS

| 8,390,725 B2 * | 3/2013 | Sekimoto | H04N 5/2254 348/340 |
| 2007/0141881 A1 * | 6/2007 | Lee | G02B 7/026 439/179 |
| 2013/0195438 A1 | 8/2013 | Hase | |

FOREIGN PATENT DOCUMENTS

| CN | 103226230 A | 7/2013 |
| JP | 2000209474 A | 7/2000 |

(Continued)

OTHER PUBLICATIONS

International Search Report (English and Japanese) and PCT Written Opinion (Japanese) dated Oct. 20, 2015 issued in corresponding PCT International Application No. PCT/JP2015/071480.

*Primary Examiner* — Twyler L Haskins
*Assistant Examiner* — Angel L Garces-Rivera
(74) *Attorney, Agent, or Firm* — Troutman Sanders LLP

(57) ABSTRACT

An imaging device having a lens group having lenses; a lens frame that holds said lens group; a base that holds said lens frame; an imaging element that has an imaging area; and a compression coil spring that prescribes the position of the lens frame relative to the imaging element so as to keep the optical axis of the lens group perpendicular to the imaging area of the imaging element. The imaging-element side of the lens frame has an orthogonal surface that is orthogonal to the optical axis of the lens group. The compression coil spring keeps said orthogonal surface in surface contact with an area that surrounds and is parallel to the imaging area of the imaging element.

9 Claims, 16 Drawing Sheets

(56) References Cited

FOREIGN PATENT DOCUMENTS

| | | | |
|---|---|---|---|
| JP | 2005101259 | A | 4/2005 |
| JP | 2005274703 | A | 10/2005 |
| JP | 2006173248 | A | 6/2006 |
| JP | 2008219427 | A | 9/2008 |
| JP | 2012074934 | A | 4/2012 |
| JP | 2013156533 | A | 8/2013 |

* cited by examiner

IMAGING APPARATUS, OPTICAL DEVICE, ELECTRONIC DEVICE, VEHICLE, AND IMAGING-DEVICE MANUFACTURING METHOD

CROSS-REFERENCE TO RELATED APPLICATIONS

This is a U.S. national phase application under 35 U.S.C. § 371 of International Patent Application No. PCT/JP2015/071480, filed Jul. 29, 2015, and claims benefit of priority to Japanese Patent Application Nos. 2014-158248, filed Aug. 1, 2014, 2014-257330, filed Dec. 19, 2014 and 2015-015724, filed Jan. 29, 2015. The entire contents of these applications are hereby incorporated by reference.

FIELD OF TECHNOLOGY

The present invention relates to an imaging device, an optical device, an electronic device, a vehicle, and a method for manufacturing an imaging device.

BACKGROUND

An imaging device comprising a lens, a lens frame for holding the lens, a front case to which the lens frame is secured, and a circuit board on which an imaging element is mounted has been proposed (See, for example, Japanese Unexamined Patent Application Publication No. 2012-074934). In the imaging device disclosed in Japanese Unexamined Patent Application Publication No. 2012-074934, a circuit board on which an imaging element is mounted is secured through a plurality of screws to a lens frame that holds a lens, and the position of the imaging element relative to the optical axis of the lens is set through adjusting the amounts to which the individual screws are screwed into the front case.

SUMMARY

However, in the imaging device set forth in Patent Document 1, if a screw is screwed in too far, the circuit board may become tilted, so that the position of the imaging element relative to the optical axis of the lens will not be set properly.

The present invention was created in contemplation of the causes set forth above, and the object thereof is to provide an imaging device, an optical device, an electronic device, a vehicle, and a method for manufacturing an imaging device, wherein the position of an imaging element relative to the optical axis of the lens group can be set properly.

In order to achieve the object set forth above, an imaging device according to an aspect of the present invention comprises:

a lens group;
a lens frame for holding the lens group;
a lens frame holding member for holding the lens frame;
an imaging element having an imaging surface; and
a perpendicularity maintaining portion for maintaining the optical axis of the lens group in a state that is perpendicular to the imaging surface of the imaging element through setting the position of the lens frame in relation to the imaging element.

Moreover, the lens frame may have, on the imaging element side, a perpendicular face that is perpendicular to the optical axis of the lens group; and the perpendicularity maintaining portion may have a contact maintaining portion for maintaining a state wherein the perpendicular face is in surface contact with a position of the imaging element that is parallel to the imaging surface in the outer peripheral portion of the imaging surface.

Moreover, the lens frame may have a main unit portion that is cylindrical, and, at one end portion in the cylinder axial direction of the main unit portion, a large-diameter portion that is perpendicular to the cylinder axis and that extends in a direction away from the cylinder axis; and the lens frame holding member may have a lens frame holding portion that is provided with an opening portion into which the main unit portion is fitted.

Moreover, the contact maintaining portion may be structured from an elastic member for biasing the lens frame in the direction that presses the perpendicular face to the imaging surface.

Moreover, the elastic member may be structured from a coil compression spring.

Moreover, the lens frame may have a movement constraining portion, in the vicinity of the perpendicular face of the lens frame, for constraining movement of the lens frame in a direction that is perpendicular to the optical axis of the lens group.

Additionally, the image device may further have:

a flexible printed circuit board that is shaped as a sheet, and wherein the imaging element is mounted on one surface side thereof and an electronic component is mounted on the other surface side thereof, with the one surface side facing the lens frame holding member; and a securing frame, interposed between the lens frame holding member and the flexible printed circuit board, for securing the imaging element to the lens frame holding member, in which case:

the perpendicularity maintaining portion may be interposed between the lens frame holding member and the flexible printed circuit board and the securing plate, and may be structured from an adhesive agent for bonding the lens frame holding member to the flexible printed circuit board and the securing plate in a state wherein the optical axis of the lens group is perpendicular to the imaging surface of the imaging element.

Moreover, the electronic component maybe mounted on the other surface side of a facing location, of the flexible printed circuit board, that faces the lens frame holding member in the optical axial direction of the lens group.

Moreover, the flexible printed circuit board may have an extended portion that extends from the facing location; and an adhesive agent may be interposed between the lens frame holding member and the extended portion.

Additionally, the image device may further include:

a connecting member that is long and thin, connected to the lens frame holding member in a state protruding to the imaging element side of the lens frame holding member, in which case:

the securing plate may have a through hole, in a position that corresponds to the connecting member that is connected to the lens frame holding member, into which the connecting member is inserted in a state wherein the inner edge portion is away from a side face of the connecting member; and an adhesive agent may be interposed between the connecting member and the inner edge of the through hole.

Additionally, the image device may further have:

a circuit board whereon the imaging element and an electronic component are mounted on the same surface side; and a heat dissipating grease, interposed between the lens frame holding member and the electronic component, for carrying, to the lens frame holding member, heat that is produced by the electronic component, in which case:

the lens frame holding member may be disposed so as to cover the surface side of the circuit board on which the imaging element and the electronic components are mounted, may maintain a state wherein the optical axis of the lens group is perpendicular to the imaging surface of the imaging element, and may have a grease filling duct for filling the heat dissipating grease between the lens frame holding member and the electronic component.

Moreover, the grease filling duct may be structured from a through hole that is formed in a position that faces the electronic component, in the direction that is perpendicular to the face of the circuit board whereon the imaging element and the electronic component are mounted, in the lens frame holding member.

Moreover, an optical device according to another aspect according to the present invention is provided with an imaging device as set forth above.

Moreover, an electronic device according to a further aspect according to the present invention is provided with an imaging device as set forth above.

Moreover, a vehicle according to a yet further aspect according to the present invention is provided with an imaging device as set forth above.

Moreover, a method for manufacturing and imaging device according to an even further aspect according to the present invention includes:

a step for securing the lens group to the lens frame;

a step for securing the lens frame to the lens frame holding member; and a step for supporting a state wherein the optical axis of the lens group is caused to be perpendicular to the imaging surface of the imaging element through setting the position the position of the lens frame relative to the imaging element.

Effects of the Invention

The present invention enables the position of an imaging element relative to the optical axis of a lens to be set properly.

DETAILED DESCRIPTION

Imaging devices according to various examples according to the present invention will be explained in detail below in reference to the drawings.

Example 1

Figure 1:
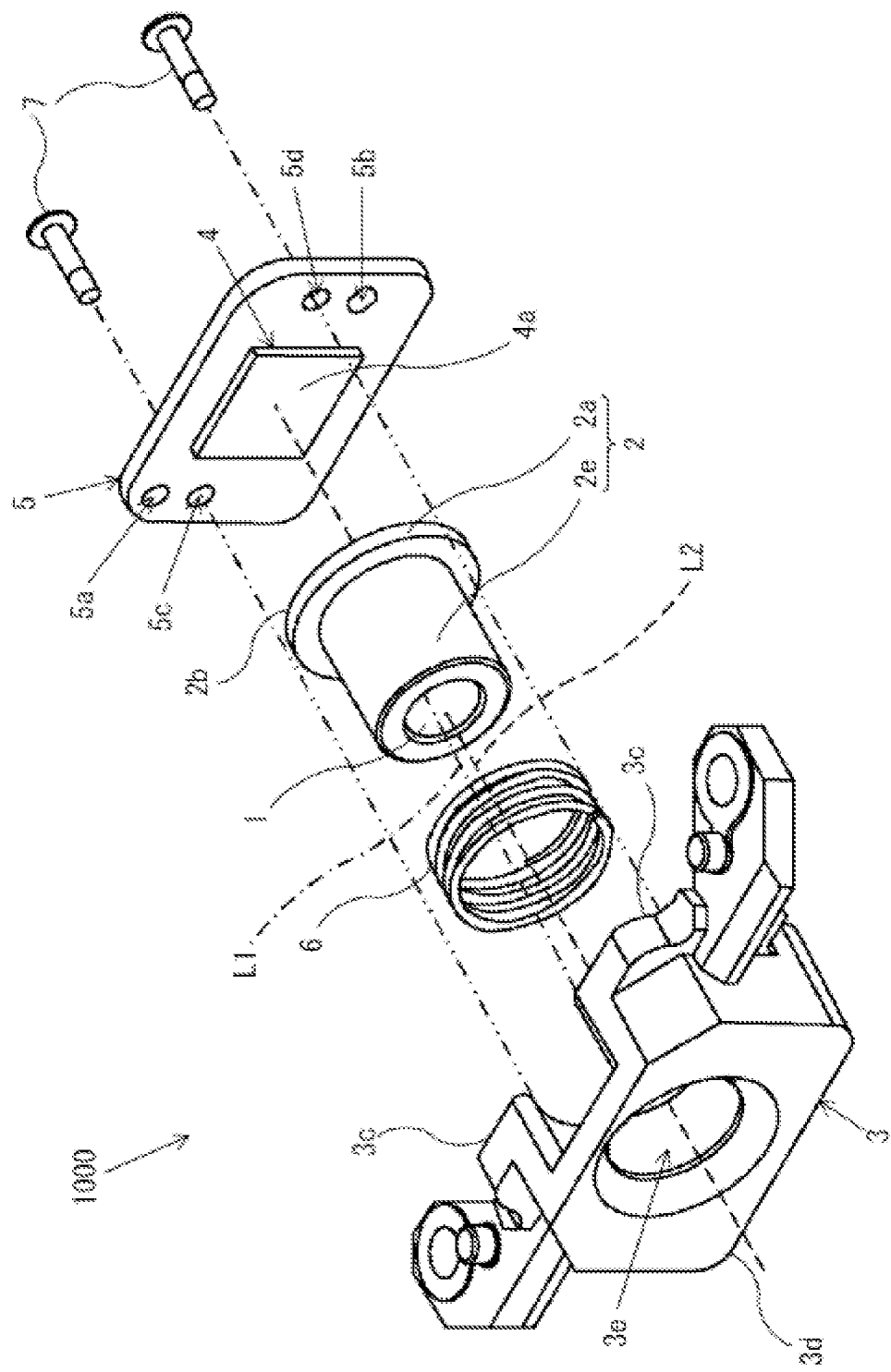
FIG. 1 is an assembly perspective diagram of an imaging device according to an example according to the present invention.

An imaging device 1000 according to the present example, as illustrated in FIG. 1, comprises a lens 1, a lens frame 2, a base (a lens frame holding member) 3, an imaging element 4, a circuit board 5, a coil compression spring (a contact maintaining portion) 6, and screws 7. This imaging device 1000 has an external appearance as shown in FIG. 2A through FIG. 2E.

Figure 3:
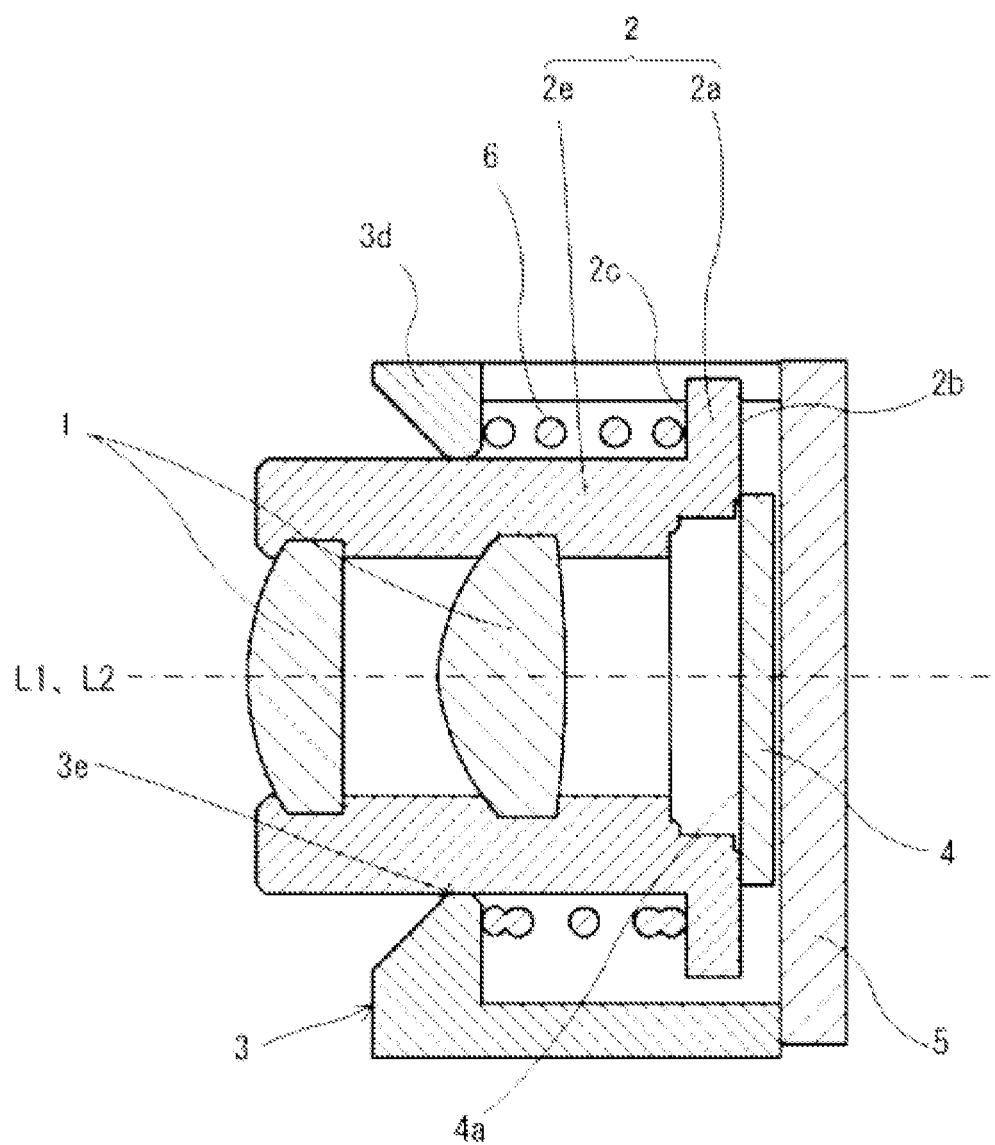
FIG. 3 is a partial cross-sectional view along the section A-A in FIG. 2B, for the example.

The lens 1 is structured from a convex lens, as illustrated in FIG. 3, for example. There are two lenses 1, structuring a single lens group. In one example, the two lenses can be plano-convex and bi-convex.

The lens frame 2 has, on the imaging element 4 side, a perpendicular face 2b that is perpendicular to the optical axis of the lens group that is formed from the two lenses 1. The lens frame 2 has a cylindrical main unit portion 2e, and a flange-shaped large diameter portion 2a that extends out in the direction away from the cylinder axis, perpendicular to the cylinder axis, connected to one end, in the cylinder axial direction, of the main unit portion 2e. The lenses 1 are disposed within the main unit portion 2e. The imaging element 4 side, in the cylinder axial direction, of the large diameter portion 2a structures the perpendicular face 2b. The lens frame 2 is disposed in a state wherein the perpendicular face 2b of the large diameter portion 2a contacts the imaging surface 4a of the imaging element 4. The lens frame 2 is formed from, for example, a resin material or a metal material such as aluminum. When the lens 1 is secured to the lens frame 2 through, for example, a method such as heat caulking, preferably the lens frame 2 is formed from a resin material that is suitable for heat caulking. Resin materials that are suitable for heat caulking include, for example, polycarbonate (PC), polymethyl methacrylate (PMMA), polyethylene, polypropylene, polyvinyl chloride, polystyrene, acrylonitrile butadiene styrene (ABS), polyamide resin (PA), and the like.

The base 3 holds the lens frame 2. The base 3 has a lens frame holding portion 3d that is provided with an opening portion 3e into which is fitted an end portion of the lens frame 2 on the side that is opposite from the one end portion that is on the large diameter portion 2a side of the main unit portion 2e thereof. Positioning protrusions 3a and 3b (referencing FIG. 2B) for determining the position of the circuit board 5 protrude on the circuit board 5 side of the base 3. This base 3 is formed from, for example, a resin material or a metal material such as aluminum. The resin material may be, for example, polycarbonate (PC), polymethyl methacrylate (PMMA), polyethylene, polypropylene, polyvinyl chloride, polystyrene, acrylonitrile butadiene styrene (ABS), polyamide resin (PA), or the like.

The imaging element 4 captures an image of the photographic subject that is focused onto the imaging surface 4a through the lens group that is formed from the two lenses 1. The imaging surface 4a corresponds to the part in the package, of the imaging element 4, that receives light from the outside. The imaging element 4 is provided with a solid-state imaging element such as a CCD (charge-coupled device), a CMOS (complementary metal oxide semiconductor), or the like, for capturing an image of the photographic subject that is focused onto the imaging surface 4a through the lens group. Moreover, the position of contact of the lens frame 2 on the outer peripheral portion of the imaging surface 4a in the package of the imaging device 4 is flat, and is parallel to the imaging surface 4a. The imaging element 4 is secured to the circuit board 5. The imaging element 4 is mounted on the circuit board 5 through a conductive material (not shown) that is provided on the circuit board 5. The conductive material may be, for example, solder.

Figure 2A:
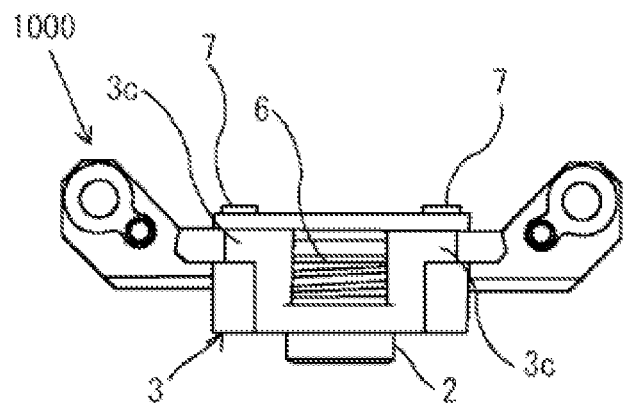
FIG. 2A is a top view of the exterior of an imaging device 1000 according to the example.
Figure 2B:
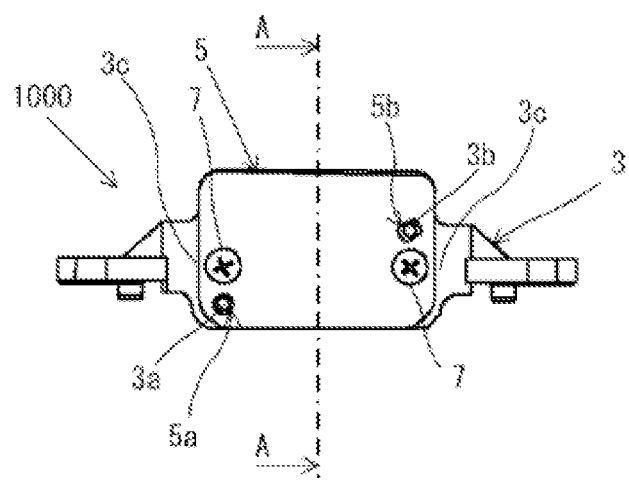
FIG. 2B is a back view of the exterior of an imaging device 1000 according to the example.
Figure 2C:
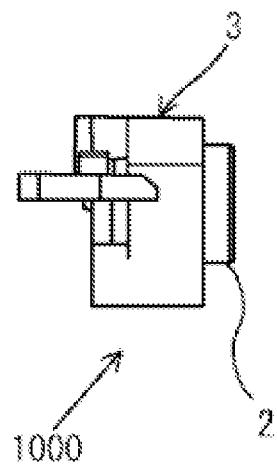
FIG. 2C is a left side view of the exterior of an imaging device 1000 according to the example.
Figure 2D:
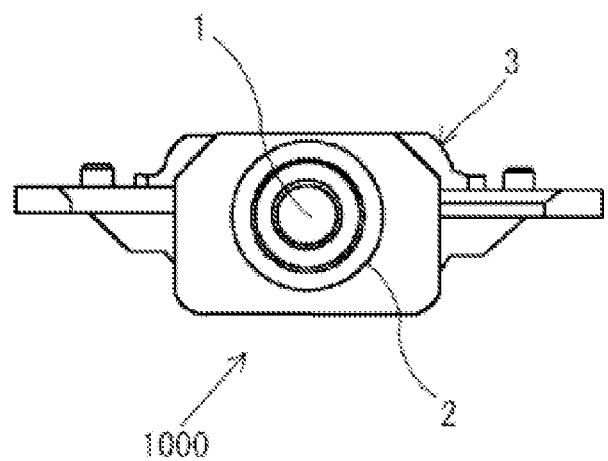
FIG. 2D is a front view of the exterior of an imaging device 1000 according to the example.
Figure 2E:
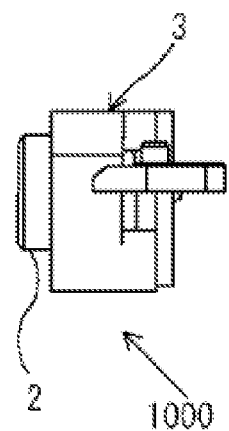
FIG. 2E is a right side view of the exterior of an imaging device 1000 according to the example.

As illustrated in FIG. 1, the circuit board 5 has through holes 5a and 5b for positioning of the circuit board 5, and through holes 5c and 5d for insertion of screws 7 for securing the circuit board 5 to the base 3. The circuit board 5, as illustrated in FIG. 2B, is screwed to a securing portion 3c of the base 3 through screws 7 that are inserted into the through holes 5c and 5d in a state wherein the positioning protrusions 3a and 3b of the base 3 are fitted into the two through holes 5a and 5b for positioning.

Figure 4:
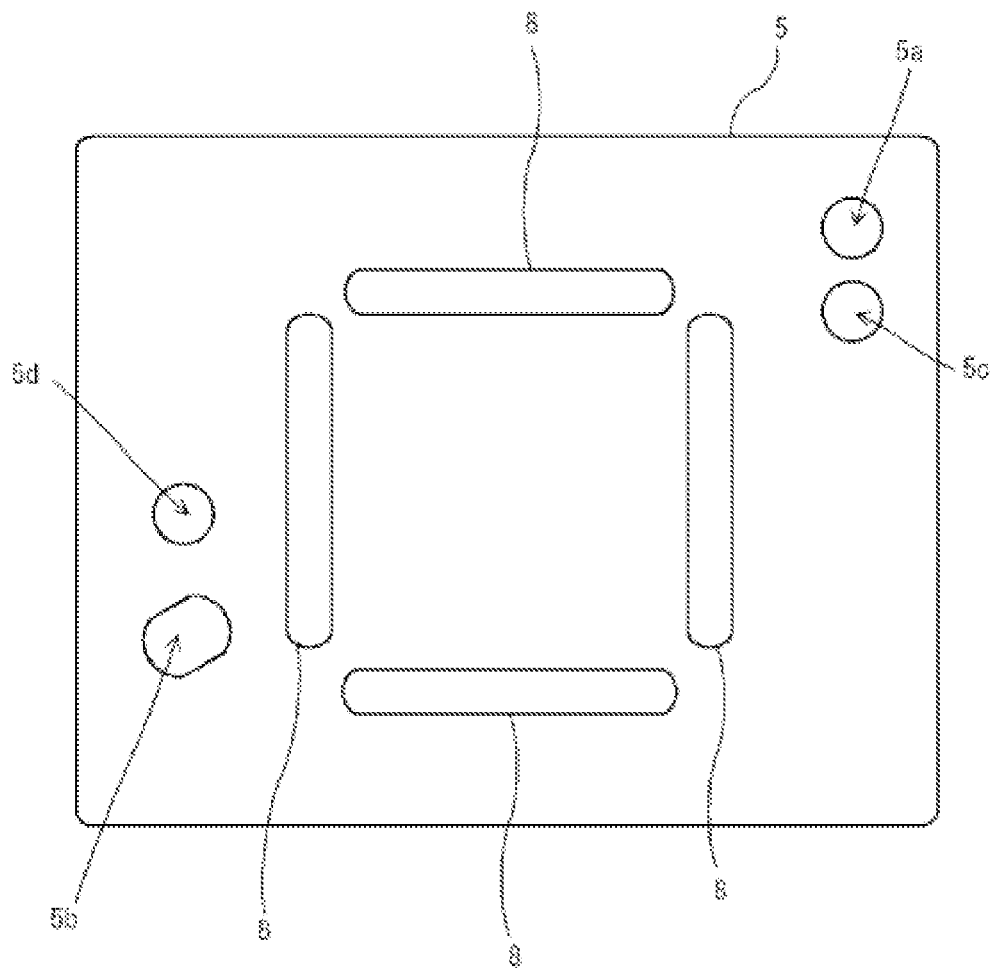
FIG. 4 is a plan view of the circuit board in the example.
Figure 5:
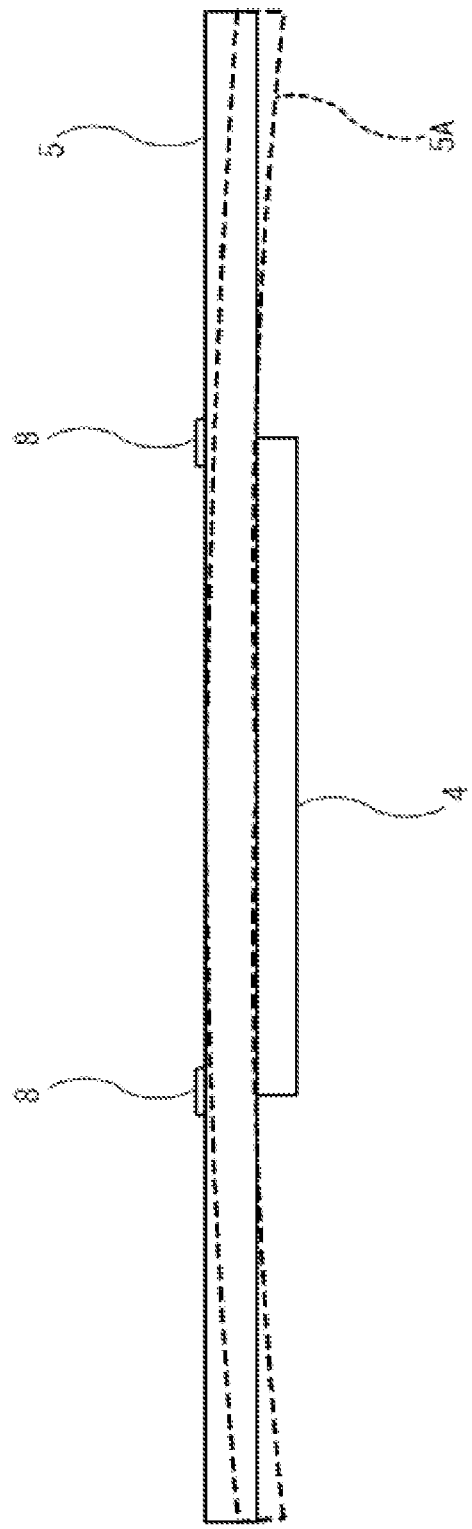
FIG. 5 is a schematic side view of the circuit board in the example.

Note that when the imaging element 4 is mounted on the circuit board 5, as illustrated in FIG. 5, the circuit board 5 may be warped, through heating, or the like, to the side that is the surface where the imaging element 4 is provided, as illustrated in FIG. 5 (referencing the dotted line 5A). In the present example, as illustrated in FIG. 4 and FIG. 5, the conductive materials 8 are provided on the face of the circuit board 5 that is on the side that is opposite from the face wherein the imaging element 4 is provided. As illustrated in FIG. 4, the conductive materials 8 are provided at positions that correspond to the peripheral edge portion of the imaging element 4 on the face that is on the side opposite from the face of the circuit board 5 whereon the imaging element 4 is mounted. The conductive material 8 may be, for example, solder. Doing so enables suppression of the warping of the circuit board 5 that is produced when the imaging element 4 is mounted on the circuit board 5.

The coil compression spring 6 is an elastic member for biasing the lens frame 2 in the direction in which the perpendicular face 2b is pressed against the imaging surface 4a of the imaging element 4. The coil compression spring 6, in a state wherein it is wound onto the main unit portion 2e of the lens frame 2, is held between the face 2c of the large diameter portion 2a on the main unit portion 2e side and the outer peripheral portion of the opening portion 3e of the base 3. The coil compression spring 6, when disposed in a compressed state, produces a force in the direction that presses the lens frame 2 against the imaging element 4, through the force of restitution of the coil compression spring 6.

Through this force, a state is preserved wherein the perpendicular face 2b of the lens frame 2 makes surface contact with a position that is parallel to the imaging surface 4a on the outer peripheral portion of the imaging surface 4a of the imaging element 4. Through this, the base 3 can hold the lens frame 2 so that the optical axis L1 of the lens group that is structured from the two lenses 1 will be perpendicular to the imaging surface 4a of the imaging element 4. In this way, the coil compression spring 6 produces a force that presses the lens frame 2 against the imaging element 4, to maintain a state wherein the perpendicular face 2b of the lens frame 2 is in surface contact with a position that is parallel to the imaging surface 4a on the outer peripheral portion of the imaging surface 4a of the imaging element 4. That is, the coil compression spring 6 structures a perpendicularity maintaining portion, for maintaining the optical axis L1 of the lens group that is structured from the two lenses 1 in a state that is perpendicular to the imaging surface 4a of the imaging element 4, through causing the perpendicular face 2b of the lens frame 2 to make surface contact with a position that is parallel to the imaging surface 4a, on an outer peripheral portion of the imaging surface 4a of the imaging element 4.

In assembling the imaging device, typically the position of the imaging element is adjusted using the position of the lens frame as the reference. However, the method wherein the position of the imaging element is adjusted using the position of the lens frame as the reference requires adjustments that take into consideration the variability of the slope of the imaging element relative to the circuit board, causing the adjusting operation to be complex.

In contrast, with the imaging device 1000 according to the present example, even if there is variability in the slope of the imaging element 4 in relation to the circuit board 5, a surface contact can be made between the perpendicular face 2b of the lens frame 2 and a position that is parallel to the imaging surface 4a, on the outer peripheral portion of the imaging surface 4a of the imaging element 4, making it possible to preserve a state wherein the optical axis L1 of the lens group that is structured from the two lenses 1 is perpendicular to the imaging surface 4a of the imaging element 4. This enables prevention of a negative effect on the resolution, or a reduction in guaranteed resolution in the design, in the image or video captured through imaging with the imaging device 1000 that would be caused by the optical axis L1 of the lens group that is structured from the two lenses 1 being at an angle relative to the direction that is perpendicular to the imaging surface 4a of the imaging element 4.

Moreover, in the imaging device 1000 according to the present example, the lens frame 2 has a main unit portion 2e and a large diameter portion 2a, and the base 3 has a lens frame holding portion 3d that is provided with an opening portion 3e into which the main unit portion 2e fits. Through this, the lens frame 2 is held by the lens frame holding portion 3d, making it possible to prevent the optical axis L1 of the lens group that is structured from the two lenses 1 from being off-axis.

Moreover, in the imaging device 1000 according to the present example, the elastic force of the coil compression spring 6 can be used to cause the imaging surface 4a of the imaging element 4 to always make contact with the perpendicular face 2b of the lens frame 2.

Moreover, the coil compression spring 6 can produce the desired elastic force more easily than a leaf spring, or the like, and has a simple structure, and thus has the benefit of being incorporated into the imaging device 1000 easily.

Example 2

Figure 6:
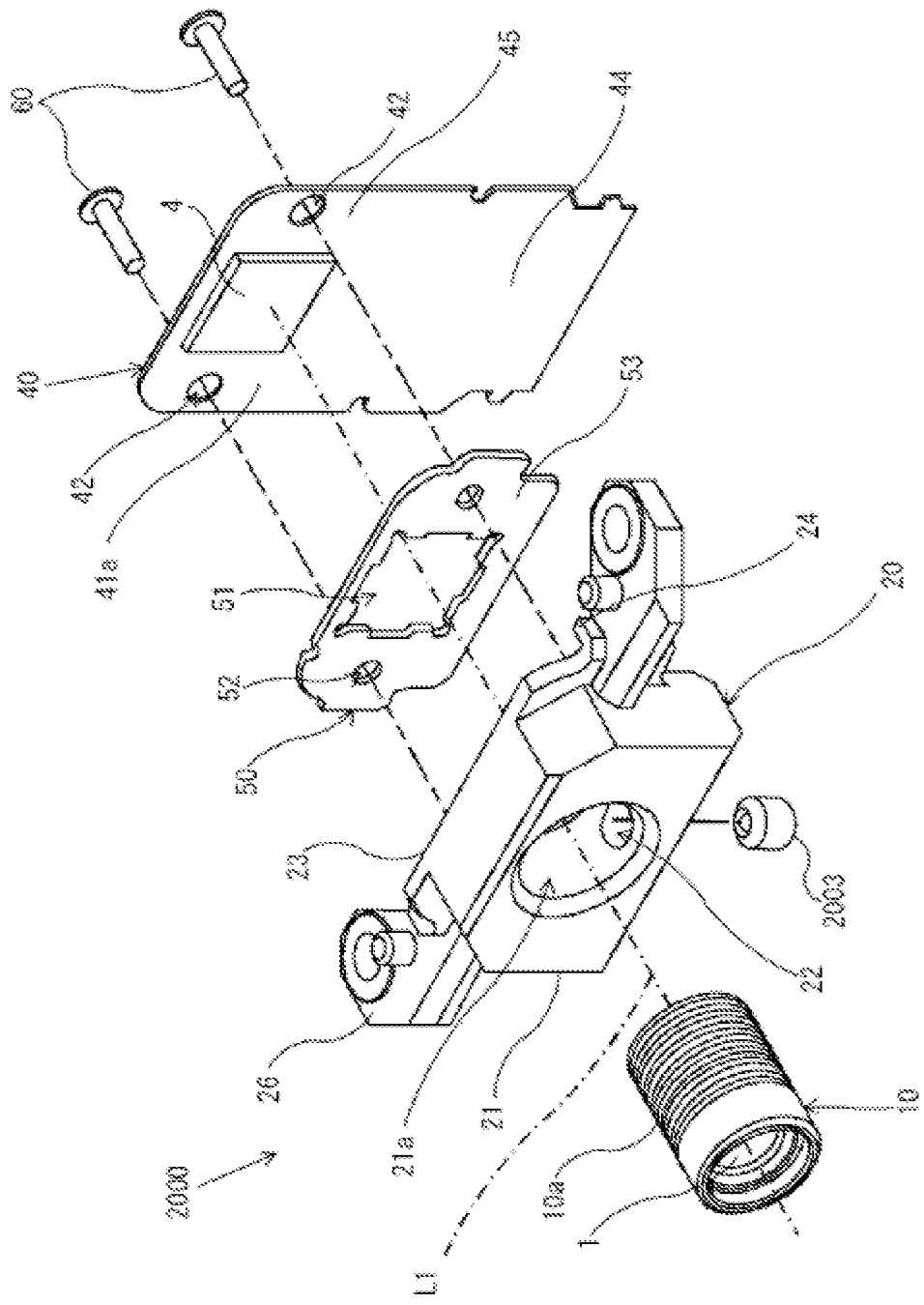
FIG. 6 is an assembly perspective diagram of an imaging device according to another example according to the present invention.
Figure 7:
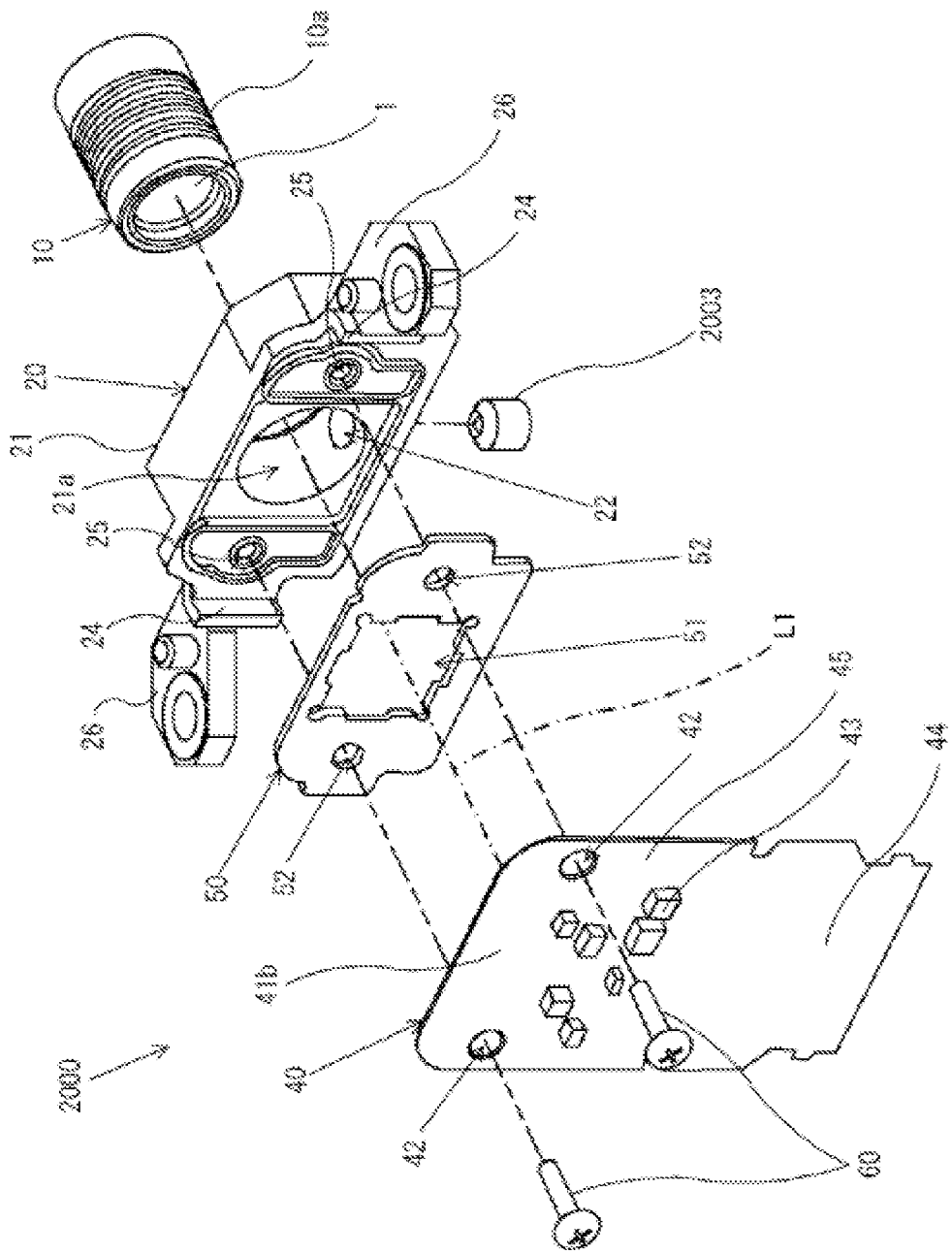
FIG. 7 is an assembly perspective diagram of an imaging device according to the other example.

An imaging device 2000 according to the present example, as illustrated in FIG. 6 and FIG. 7, comprises a lens barrel (lens frame) 10, a lens barrel holding member (lens frame holding member) 20, an imaging element 4, a flexible printed circuit board 40, a securing plate 50, screws 60, and an adhesive agent. Note that structures that are identical to those in the first example are assigned reference symbols that are the same as those in FIG. 1. The imaging device 2000 will be explained as that which is attached to a vehicle. Here "vehicle" refers to, for example, a vehicle for transporting passengers or cargo, such as a train or an automobile.

A lens 1 that has an optical axis L1 is secured to the lens barrel 10. The lens barrel 10 is formed from a resin material, or the like, into a cylinder, and the lens 1 is held therein. Male threads, for securing the lens barrel 10 to the lens barrel holding member 20, are formed on the outer peripheral surface of the lens barrel 10.

The lens barrel holding member 20 holds the lens barrel 10 in a state wherein the lens barrel 10 is secured by a locking screw 2003. The lens barrel holding member 20 is formed from a resin material, or the like. The lens barrel holding member 20 has a lens barrel holding portion (lens frame holding portion) 21 that is provided with a through hole 21a into which the lens barrel 10 is inserted, and a through hole 22 that extends in a direction that is essentially perpendicular to the axis of the through hole 21a. Female threads (not shown), for screwing together with the male threads 10a of the lens barrel 10, are formed in the through hole 21a. Female threads for screwing together with the locking screw 2003 are formed on the inner peripheral surface of the through hole 22. In the through hole 21a, the axis thereof is essentially coaxial with the optical axis L1. The lens barrel holding member 20 is provided with a sidewall portion 24 that protrudes toward the securing plate 50 side from the peripheral portion of the back face 23 that faces the securing plate 50, two screw holes 25 that are open in the back face 23, and two flange portions 26 for attaching to the vehicle. The sidewall portion 24 defines a region for holding an adhesive agent between the sidewall portion 24 and the securing plate 50. Screws 60 are screwed into the screw holes 25. The lens barrel holding member 20 holds the lens barrel 10 in a state wherein the tip end portion of the locking screw 2003 that is inserted into the through hole 22 makes pressing contact against the outer peripheral side face of the lens barrel 10 that is screwed into the through hole 21a.

A flexible printed circuit board 40 is shaped as a sheet, with the imaging element 4 mounted on one surface side thereof, and electronic components 43, such as IC chips, resistors, capacitors, and the like, mounted on the other surface side thereof, where the one surface side whereon the imaging element 4 is mounted faces the lens barrel holding member 20. The flexible printed circuit board 40 has, in the direction of the optical axis L1 of the lens group that is structured from the two lenses 1, a facing location 45 that faces the lens barrel holding member 20, and an extended portion 44 that extends from the facing location 45. Two through holes 42, into which screws 60 are inserted, are provided in the facing location 45. An interconnection (not shown) that is connected to the imaging element 4 is provided at a forward region 41a of the surface side on which the imaging element 4 is mounted in the facing location 45. Moreover, an interconnection (not shown) that is connected to the electronic component 43 is provided at a rearward region 41b of the surface side on which the electronic component 43 is mounted on the facing location 45. Both of the through holes 42 have inner diameters that are larger than the outer diameters of the shaft portions of the screws 60. The extended portion 44 corresponds to the part that is connected to the connector on the vehicle side when the imaging device 2000 is attached to the vehicle.

The securing plate 50 is interposed between the lens barrel holding member 20 and the flexible printed circuit board 40, and is for securing the position of the imaging element 4. The securing plate 50 has two through holes 52 into which are inserted respective two screws, in a state wherein the inner edge portions are away from the side surfaces of the screws 60, at positions corresponding to the screws 60 that are connected to the lens barrel holding member 20. Moreover, an essentially rectangular opening portion 51 that is slightly larger than the external dimension of the imaging element 4, in the plan view, is provided in the securing plate 50. The securing plate 50 is made from metal, or the like. Each of the through holes 52 have inner diameters that are larger than the outer diameters of the shaft portions of the screws 60. The securing plate 50, in a state wherein the imaging element 4 is disposed within the opening portion 51, secures the imaging element 4, through an adhesive agent (not shown) that is filled into the region between the outer edge portions of the imaging element 4 and the inner edge portions of the opening portion 51.

The screws 60 are screwed into the lens barrel holding member 20, and in a state wherein they protrude on the imaging element 4 side of the lens barrel holding member 20, they structure a connecting member that is connected to the lens barrel holding member 20. Each screw 60 is provided with a shaft portion wherein threads are cut, and a head portion that has an outer diameter that is larger than the outer diameter of the shaft portion. The shaft portion of the screw 60 partitions the total thread wherein threads are cut along the axial direction as a whole, and the outer diameter thereof is smaller than the inner diameter of the through holes 52 of the securing plate 50 and smaller than the inner diameter of the through holes 42 of the flexible printed circuit board 40. In the head portion of the screw 60, a plus-shaped hole, to which the tool is applied when the screw is screwed in, is formed in the surface thereof, and the outer dimensions are larger than the inner diameter of the through holes 52 of the securing plate 50 and larger than the inner diameter of the through holes 42 of the flexible printed circuit board 40. The screws 60 are to prevent the securing plate 50 and the flexible printed circuit board 40 from becoming detached from the lens barrel holding member 20.

Moreover, in a state wherein the screws 60 are screwed into the screw holes 25 and the tip end portions of the shaft portions of the screws 60 are in contact with the bottoms of the screw holes 25, uniform gaps are secured between the back face 23 of the lens barrel holding member 20 and the front face 53 of the securing plate 50, and between the flexible printed circuit board 40 and the head portions of the screws 60. Here the securing plate 50 is formed with dimensions to produce the prescribed gap between the flexible printed circuit board 40, which is disposed on the back face thereof, and the head portions of the screws 60.

Figure 8:
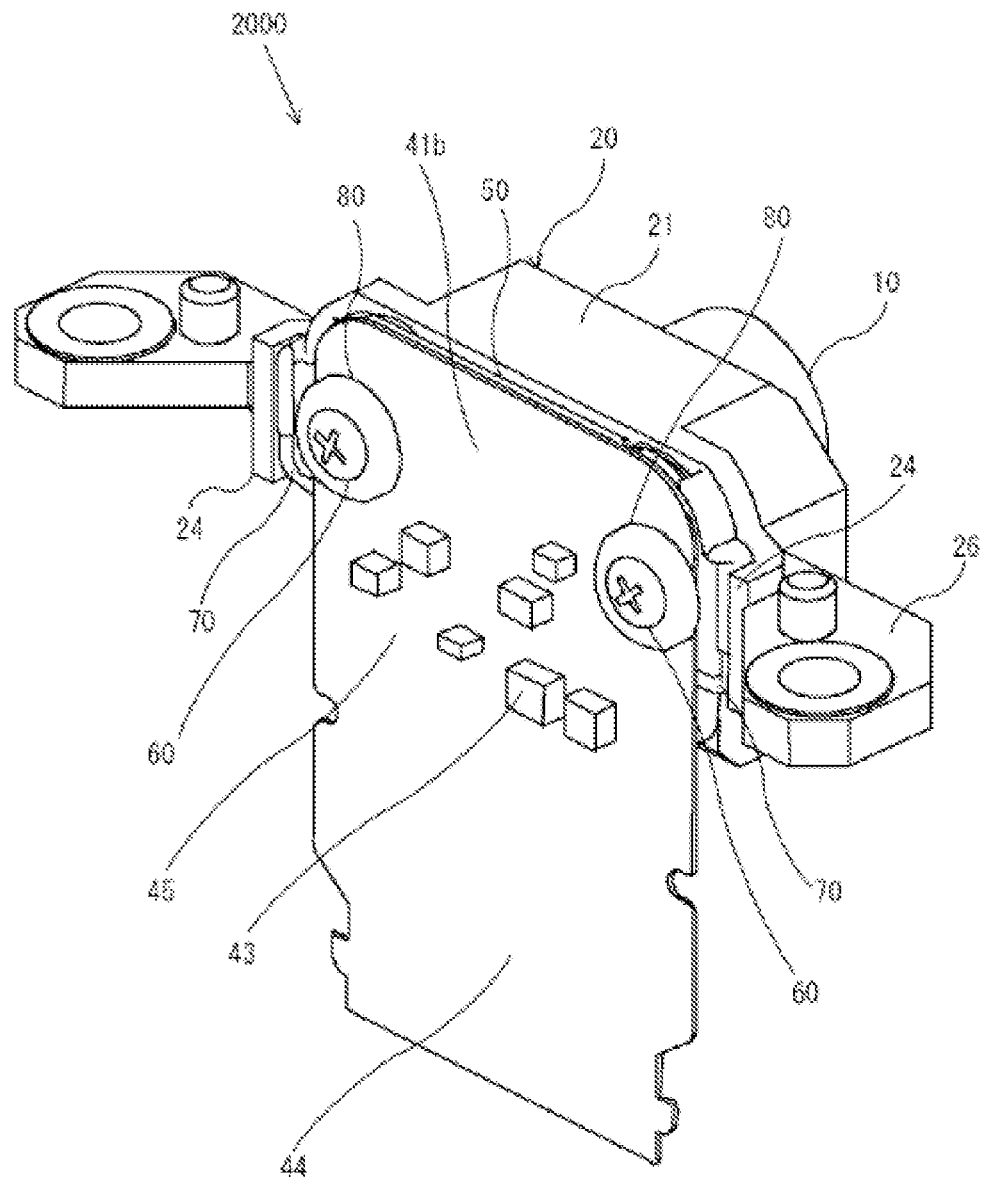
FIG. 8 is a perspective diagram of an imaging device according to the other example.

An adhesive agent 70 is filled between the lens barrel holding member 20 and the securing plate 50. The adhesive agent 70, as illustrated in FIG. 8, is interposed between the lens barrel holding member 20 and the securing plate 50, to secure them both in a non-contact state. The adhesive agent 70 is provided (either filled or coated) between the sidewall portion 24 of the back face 23 side of the lens barrel holding member 20 and the outer peripheral edge portion of the securing plate 50, in a state wherein the front face 53 of the securing plate 50 is facing the back face 23 of the lens barrel holding member 20, without making contact, with a prescribed gap therebetween. The adhesive agent 70 is cured through, for example, exposure to ultraviolet radiation. Here the adhesive agent 70 may be filled between the lens barrel holding member 20 and the securing plate 50 after they have been disposed facing each other at the time of assembly, or may be coated onto the back face 23 side of the lens barrel holding member 20, or onto the outer edge portion of the securing plate 50, prior to the lens barrel holding member 20 being disposed facing the securing plate 50.

The position in the adhesive agent 80 that is positioned on the inside of the through hole 52 of the securing plate 50 is interposed between the screw 60 and the inner edge of the through hole 52 of the securing plate 50. Moreover, the position in the adhesive agent 80 that is positioned on the back surface side of the flexible printed circuit board 40 is interposed between the head portion of the screw 60 and the back face of the flexible printed circuit board 40. The adhesive agent 80 is filled or coated between the screw 60 and the inner edge of the through hole 52 of the securing plate 50 and between the head portion of the screw 60 and the rearward region 41b of the flexible printed circuit board 40, in a state wherein the screw 60 is screwed into the screw hole 25 of the lens barrel holding member 20. In this case, the state will be one wherein the back face 23 of the lens barrel holding member 20 is away from the front face 53 of the securing plate 50, a state wherein the securing plate 50 is away from the flexible printed circuit board 40. The adhesive agent 80 is structured from an adhesive agent that is, for example, cured through exposure to ultraviolet radiation.

Figure 9:
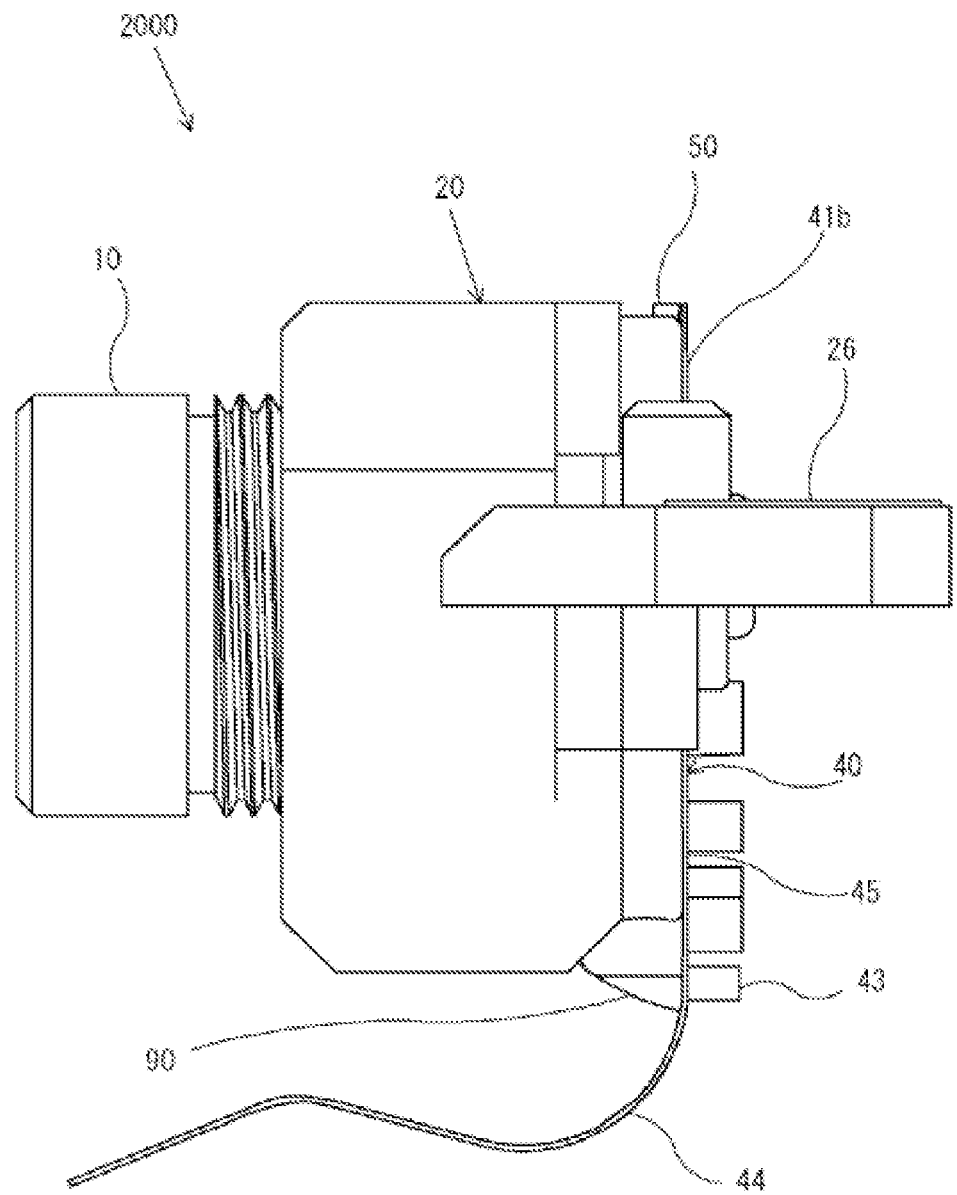
FIG. 9 is a side view of an imaging device according to the other example.

An adhesive agent 90, as illustrated in FIG. 9, is interposed between the outer edge portion of the lens barrel holding member 20 and the extended portion 44 of the flexible printed circuit board 40. The existence of this adhesive agent 90 enables avoidance of damage to the connecting portions wherein the electronic components 43 are connected electrically to the interconnections that are provided on the flexible printed circuit board 40, even if the extended portion 44 of the flexible printed circuit board 40 is bent when, for example, the imaging device 2000 is attached to the vehicle. That is, interconnections that are provided on a rearward region 41b of the flexible printed circuit board that are wider than the region defined by the back face 23 of the lens barrel holding member 20 that faces the front face 53 of the securing plate 50 are connected to a plurality of electronic components 43 through a conductive material, such as solder.

Moreover, the adhesive agent 90 is provided along the outer edge of the lens barrel holding member 20 in the vicinity of the boundary between the rearward region 41b of the flexible printed circuit board 40 and the extended portion 44. The adhesive agent 90 is provided at the end of a region that is wider than the rearward region 41b wherein the plurality of electronic components 43 is disposed. In this way, the adhesive agent 90 is provided (filled or coated) between the lens barrel holding member 20 and the forward region 41a of the flexible printed circuit board 40. The adhesive agent 90 is structured from an adhesive agent that is, for example, cured through exposure to ultraviolet radiation.

The method for assembling the imaging device 2000 according to the present example will be explained next. First the flexible printed circuit board 40 and the securing plate 50 are disposed facing each other with a prescribed gap (in a non-contact state) to the rear of the lens barrel holding member 20 that holds the lens barrel 10. In this case, the flexible printed circuit board 40 and the securing plate 50 are maintained in space by a prescribed holding mechanism. Following this, the shaft portions of the screws 60 are inserted into the through holes 52 of the securing plate 50 and into the through holes 42 of the flexible printed circuit board 40, from the rear of the flexible printed circuit board 40.

Following this, the tip end portions of the shaft portions of the screws 60 are screwed into the screw holes 25 of the lens barrel holding member 20. In this case, the securing plate 50 and the flexible printed circuit board 40 are held in a non-contact state.

Thereafter, the adhesive agent 70 is filled between the sidewall portion 24 of the back surface side of the lens barrel holding member 20 and the outer edge portion of the securing plate 50. Here the adhesive agent 70 may be coated instead in advance onto the back surface side of the lens barrel holding member 20 or onto the outer edge portions of the securing plate 50.

Following this, the adhesive agent 80 is filled between the screws 60, the fastening plate 50, and the flexible printed circuit board 40, and the adhesive agent 90 is filled between the lens barrel holding member 20 and the flexible printed circuit board 40.

Following this, a prescribed optical axis adjusting apparatus (not shown) is used to adjust the optical axial position (to adjust the position in the direction of the optical axis L1, the position in the direction perpendicular to the optical axis L1, and the slope relative to the optical axis L1), after which the adhesive agents 70, 80, and 90 are exposed to ultraviolet radiation to cure the adhesive agents 70, 80, and 90. The assembly of the imaging device 2000 is completed thereby. In this way, in a state wherein the adhesive agents 70, 80, and 90 have been cured, the lens barrel holding member 20 will function as a perpendicularity maintaining portion that is bonded to the flexible printed circuit board 40 and the securing plate 50, in a state wherein the optical axis L1 of the lens group that is structured from the two lenses 1 is perpendicular to the imaging surface 4a of the imaging element 4.

As explained above, given the imaging device 2000 according to the present example, the adhesive agent 70 that is interposed between the lens barrel holding member 20 and the securing plate 50, and the adhesive agent 80 that is interposed between the head portions of the screws 60 and the flexible printed circuit board 40, are cured after setting of the optical axis of the imaging element 4. Here the position of the optical axis of the imaging element 4 in the direction of the optical axis L1 of the lens group, the position thereof in the direction that is perpendicular to the optical axis L1 and the slope relative to the optical axis are set by adjusting the optical axis L1 of the imaging element 4. This makes it possible to prevent a shift in the optical axis of the imaging element 4 after the optical axis adjustment has been completed. Moreover, detachment of the securing plate 50 and the imaging element 4, even if, for example, the adhesive agent 70 between the lens barrel holding member 20 and the securing plate 50 were to come off due to a physical shock from the outside, is prevented by the adhesive agent 80 that is interposed between the head portions of the screws 60, the shafts of the screws 60, and the securing plate 50.

Moreover, in the imaging device 2000 according to the present example, an adhesive agent 90 is provided interposed between the lens barrel holding member 20 and the flexible printed circuit board 40. This enables avoidance of damage to the connecting portions between the electronic components 43 and the interconnections, through the ability to prevent bending of the connecting portions between the electronic components 43 and the interconnections when the imaging device 2000 is equipped in the vehicle. This enables production of an imaging device 2000 that can achieve a simplification in structure, and that is able to improve manufacturability, and improve reliability in functioning through resisting positional shift through securing after adjustment of the position of the imaging element 4 in relation to the optical axis L, and with no reduction in durability to mechanical shock in the event of a physical shock such as dropping, and without damaging the connecting portions between the electronic components and the interconnections, through merely providing the adhesive agent 90.

Example 3

Figure 10:
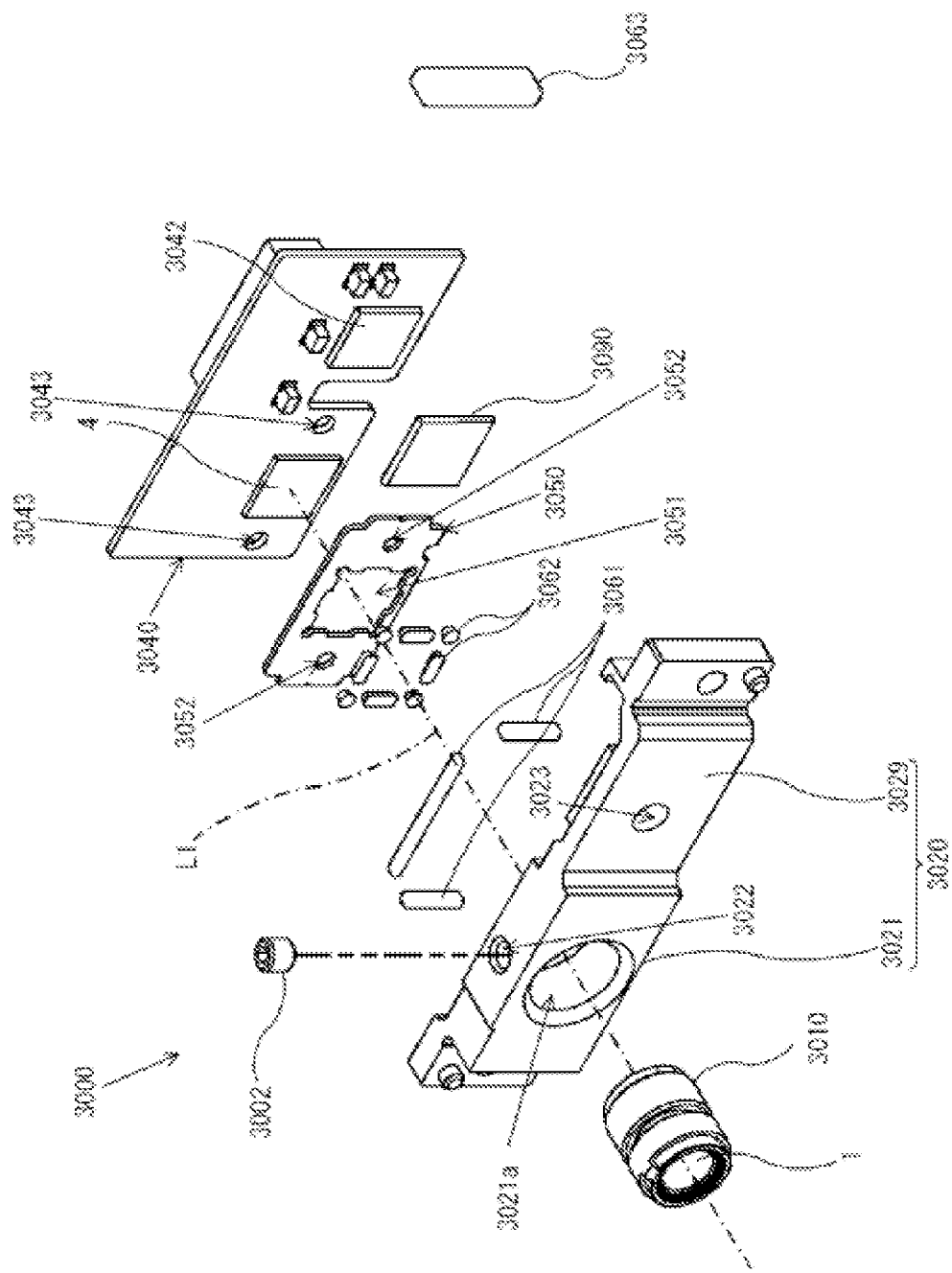
FIG. 10 is an assembly perspective diagram of an imaging device according to a further example according to the present invention.
Figure 11A:
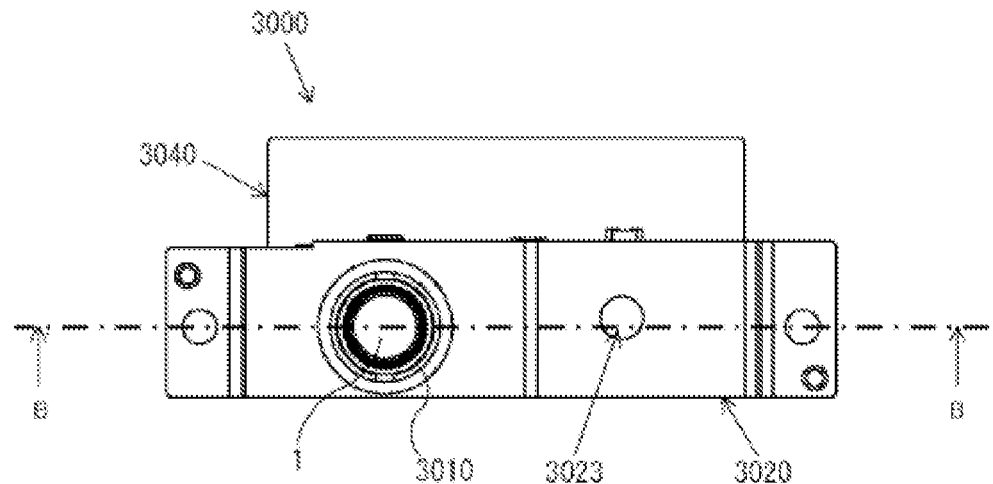
FIG. 11A is a front view of an imaging device according to the further example.
Figure 11B:
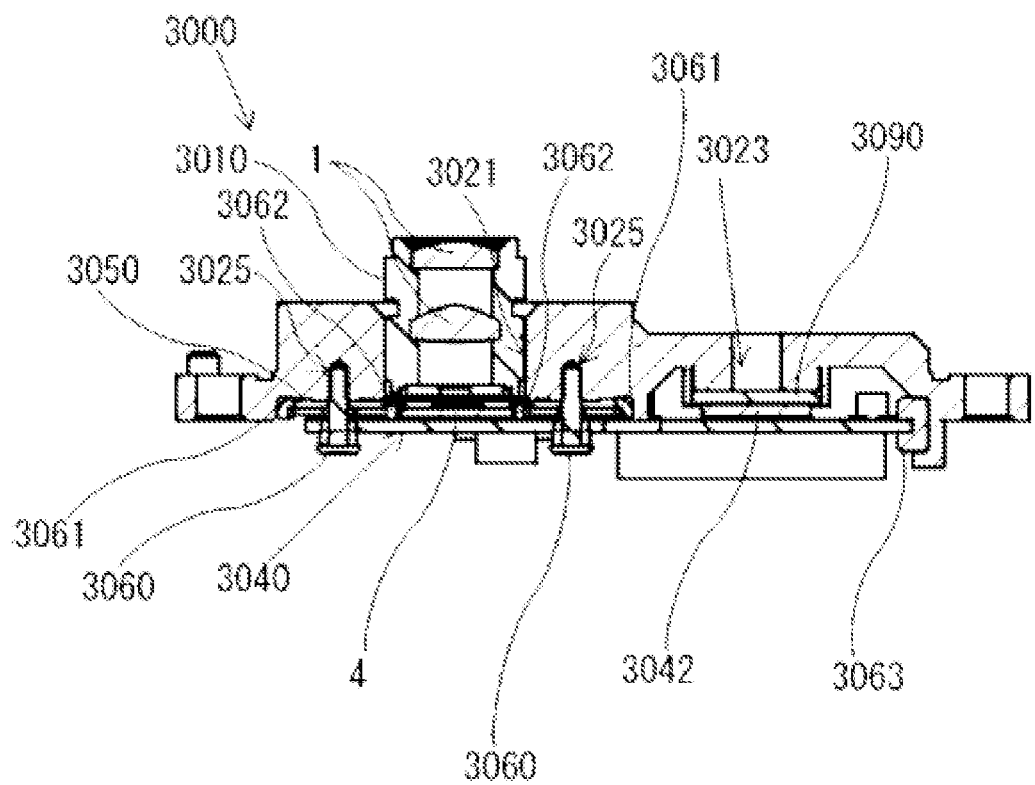
FIG. 11B is a cross-sectional diagram along the section B-B in FIG. 11A.

As illustrated in FIG. 10, the imaging device 3000 according to the present example is provided with a lens barrel (lens frame) 3010, a lens barrel holding member (a lens frame holding member) 3020, an imaging element 4, a communicating module 3042, a circuit board 3040, and a securing plate 3050. Moreover, the imaging device 3000 is further provided with adhesive agents 3061, 3062, and 3063, screws, and heat dissipating grease 3090. Note that structures that are identical to those in the first example are assigned reference symbols that are the same as those in FIG. 1. In the imaging device 3000, as illustrated in FIG. 11A, the lens barrel 3010 is secured to a position that is offsetted to one side from the center portion in the lengthwise direction of the lens barrel holding member 3020 that is long when viewed from the front face side. Moreover, as illustrated in FIG. 11B, the imaging element 4 and the communicating module 3042 are disposed, on the circuit board 3040, lined up in the lengthwise direction of the lens barrel holding member 3020.

Returning to FIG. 10, a lens 1 that has an optical axis L1 is secured to a lens barrel 3010. The lens barrel 3010 is formed from a resin material, or the like, into a cylinder, and the lens 1 is held therein.

The imaging element 4 and the communicating module (an electronic component) 3042 are mounted on the same side of the circuit board 3040. Two through holes 3043, into which screws 3060 (referencing FIG. 11B) are inserted, are formed on both sides of the imaging element 4 in the circuit board 3040. The circuit board 3040 is disposed so that the side whereon the imaging element 4 and the communicating module 3042 are mounted faces the lens barrel 3010 side.

The lens barrel holding member 3020 holds the lens barrel 3010 in a state wherein the lens barrel 3010 is secured by a locking screw 3002. This lens barrel holding member 3020 is disposed so as to cover the surface side of the circuit board 3040 wherein the imaging element 4 and the communicating module 3042 are mounted. The lens barrel holding member 3020 is formed from a material with relatively high thermal conductivity, such as metal. The lens barrel holding member 3020 is provided with a lens barrel holding portion (a lens frame holding portion) 3021 for holding a lens barrel 3010, and a module covering portion 3029, provided adjacent to the lens barrel holding portion 3021, for covering the communicating module 3042. The lens barrel holding portion 3021 is provided with a through hole 3021a into which the lens barrel 3010 fits, and a through hole 3022 that extends in a direction that is essentially perpendicular to the axis of the through hole 3021a. The through hole 3022 has female threads, for screwing together with the locking screw 3002, formed in the inner peripheral surface thereof. The lens barrel holding member 3020 holds the lens barrel 3010 in a state wherein the tip end portion of the locking screw 3002 that is inserted into the through hole 3022 is in contact with the outer peripheral side face of the lens barrel 3010 that is fitted into the through hole 3021a. In this case, the axis of the through hole 3021a is essentially coincident with the optical axis L1 of a lens group that is structured from two lenses 1. Moreover, the lens barrel holding member 3020, as illustrated in FIG. 11B, is provided with screw holes 3025 into which screws 3060 are screwed. Moreover, the lens barrel holding member 3020 maintains the optical axis L1 of the lens group that is structured from the two lenses 1 in a state that is perpendicular relative to the imaging surface 4a of the imaging element 4, and has a through hole (a grease filling duct) 3023 for filling heat dissipating grease 3090 between the lens barrel holding member 3020 and the communicating module 3042. This through hole 3023 is formed, in the lens barrel holding member 3020, in a position that faces the communicating module 3042 in a direction that is perpendicular to the surface of the circuit board 3040 on which the imaging element 4 and the communicating module 3042 are mounted.

The securing plate 3050 is for securing the imaging element 4. The securing plate 3050 is formed in a plate shape from metal, or the like. An essentially rectangular opening portion 3051 that is slightly larger than the external dimension of the imaging element 4, in the plan view, and two through holes 3052, through which screws 3060 are passed, are provided in the securing plate 3050. The securing plate 3050, in a state wherein the imaging element 4 is disposed within the opening portion 51, secures the imaging element 4, through an adhesive agent 3062 that is filled into the region between the outer edge portions of the imaging element 4 and the inner edge portions of the opening portion 3051. The adhesive agent 3062 is cured through, for example, exposure to ultraviolet radiation.

As illustrated in FIG. 11B, screws 3060 are screwed into the lens barrel holding member 3020. The screws 3060 are to prevent the securing plate 3050 and the circuit board 3040 from becoming detached from the lens barrel holding member 3020. Moreover, in a state wherein the screws 3060 are screwed into the screw holes 3025 and the tip end portions of the shaft portions of the screws 3060 are in contact with the bottoms of the screw holes 3025, a gap is secured between the lens barrel holding member 3020 and the securing plate 3050.

Returning to FIG. 10, an adhesive agent 3061 is filled between the lens barrel holding member 3020 and the securing plate 3050. The adhesive agent 3061 is filled between the lens barrel holding member 3020 and the securing plate 3050 in a state wherein the lens barrel holding member 3020 is in contact with the securing plate 3050. The adhesive agent 3061 is cured through, for example, exposure to ultraviolet radiation.

An adhesive agent 3062 is filled between the lens barrel holding member 3020 and the circuit board 3040, on the side of the circuit board 3040 with the communicating module 3042. The adhesive agent 3062 is cured through, for example, exposure to ultraviolet radiation.

The heat dissipating grease 3090, as illustrated in FIG. 11B, is interposed between the lens barrel holding member 3020 and the communicating module 3042, and is for carrying, to the lens barrel holding member 3020, the heat that is produced in the communicating module 3042. The heat dissipating grease 3090 is filled or coated between the lens barrel holding member 3020 and the circuit board 3040 through the through hole 3023 of the lens barrel holding member 3020 in a state wherein the screws 3060 that have been inserted through the through holes 3043 of the circuit board 3040 and the through holes 3052 of the securing plate 3050 have been screwed into the screw holes 3025 of the lens barrel holding member 3020.

The method for assembling the imaging device 3000 according to the present example will be explained next. First the securing plate 3050 and the circuit board 3040 are disposed behind the lens barrel holding member 3020 that is holding the lens barrel 3010. Following this, the shaft portions of the screws 3060 are inserted into the through holes 3052 of the securing plate 3050 and into the through holes 3043 of the flexible printed circuit board 3040, from the rear of the circuit board 3040.

Following this, the tip end portions of the shaft portions of the screws 3060 are screwed into the screw holes 3025 of the lens barrel holding member 3020.

Following this, the adhesive agents 3061 and 3062 are filled between back face side of the lens barrel holding member 3020 and the securing plate 3050, and the adhesive agent 3063 is filled between the lens barrel holding member 3020 and the circuit board 3040 on the circuit board 3040 side.

Following this, a prescribed optical axis adjusting apparatus (not shown) is used to adjust the optical axial position (to adjust the position in the direction of the optical axis L1, the position in the direction perpendicular to the optical axis L1, and the slope relative to the optical axis L1), after which the adhesive agents 3061, 3062, and 3063 are exposed to ultraviolet radiation to cure the adhesive agents 3061, 3062, and 3063.

Finally, the heat dissipating grease 3090 is filled into the lens barrel holding member 3020 through the through hole 3023. In this case, a syringe (not shown), for example, that is filled with heat dissipating grease is inserted into the through hole 3023, and the heat dissipating grease 3090 is filled between the lens barrel holding member 3020 and the circuit board 3040. The assembly of the imaging device 3000 is completed thereby.

Conventionally, the coating of the heat dissipating grease onto the circuit board typically is performed prior to adjusting the optical axis of the imaging element 4. In such a case, the heat dissipating grease that has been coated onto the circuit board interferes with the lens barrel holding member 20, and the like, when the optical axis of the imaging element 4 is adjusted, which may reduce the accuracy of the adjustment of the optical axis.

In contrast, in the imaging device 3000 according to the present example, the adhesive agents 3061 and 3062 that are interposed between the lens barrel holding member 3020 and the securing plate 3050 are cured after adjustment of the optical axis of the imaging element 4, after which the heat dissipating grease 3090 is filled. Because the adhesive agents 3061 and 3062 have been cured, this enables prevention of shifting of the optical axis of the imaging element 4 when the heat dissipating grease 3090 is filled.

Example 4

Figure 12:
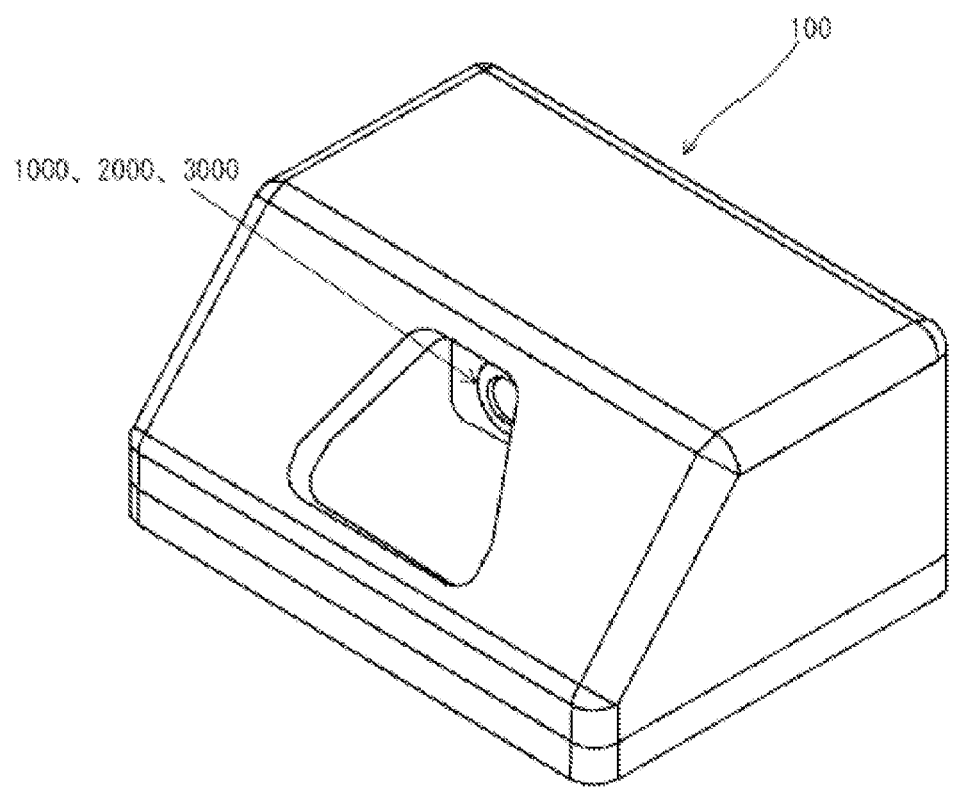
FIG. 12 is a perspective diagram of a camera according to a yet further example according to the present invention.

As illustrated in FIG. 12, the imaging devices 1000, 2000, and 3000 of the various examples described above were built into cameras 100 according to the present example. The camera at 100 may be, for example, a consumer camera, such as a digital camera, a vehicle-mounted camera, a monitoring camera, a camera mounted for medical treatment (such as an endoscope camera), a camcorder (a movie camera) for capturing video, various types of inspection cameras, a camera for a robot, or the like.

Modified Examples

Figure 13:
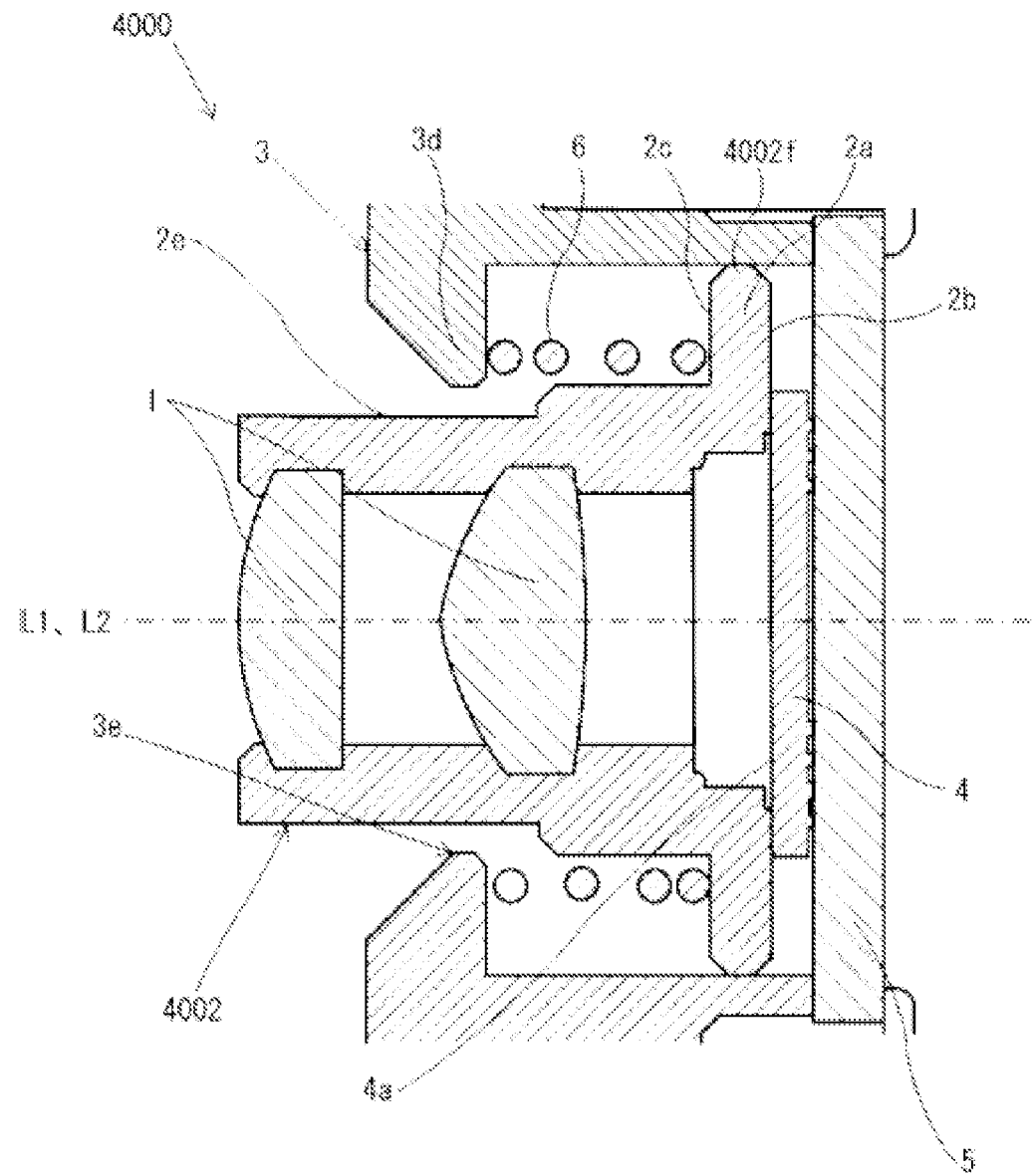
FIG. 13 is cross-sectional diagram of an imaging device according to a modified example.
Figure 14:
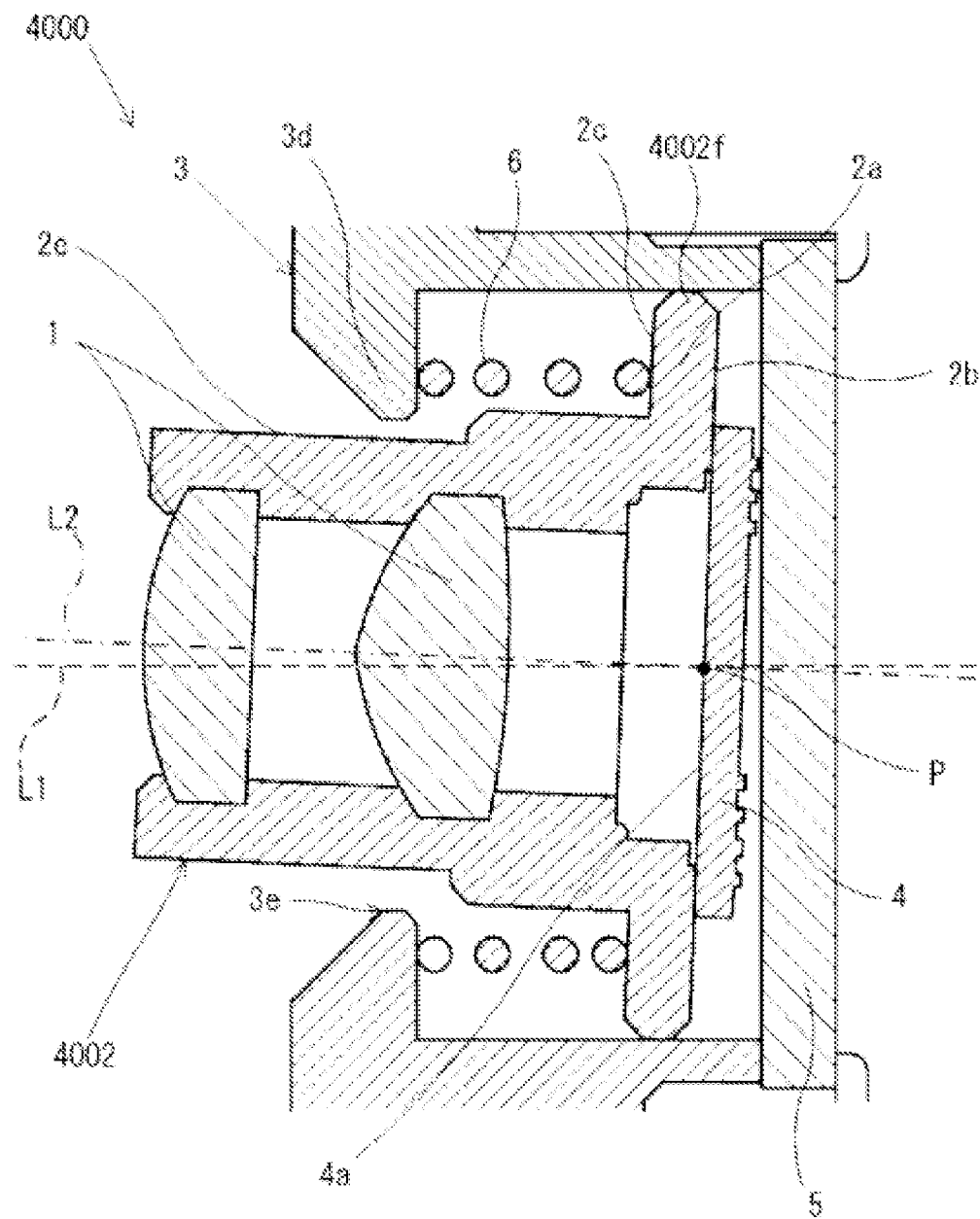
FIG. 14 is cross-sectional diagram of an imaging device according to a modified example.

While examples according the present invention have been explained above, the present invention is not limited to the examples set forth above. For example, as illustrated in FIG. 13, it may be an imaging device 4000 wherein the lens frame holding portion 3d of the base 3 has been designed in consideration of the lens frame 4002 being tilted within the lens frame holding portion 3d. In the imaging device 4000, as illustrated in FIG. 14, the lens frame holding portion 3d is designed so as to hold the lens frame 4002 with a gap that allows the optical axis L2 of the lens group, which is structured from two lenses 1, to tilt relative to the optical axis L1 in the design. With this imaging device 4000, if the imaging surface 4a of the imaging element 4 is inclined relative to the optical axis L1 in the design, then the lens frame 4002 may be tilted to cause the optical axis of the lens group L2 that is structured from the two lenses 1 to be perpendicular relative to the imaging surface 4a of the imaging element 4.

Moreover, in this imaging device 4000, a coil compression spring 6 that is wound onto the main unit portion 2e of the lens frame 4002 is disposed in a state wherein it is compressed between a face 2c that is on the side opposite from a perpendicular face 2b of a large diameter portion 2a, and a lens frame holding portion 3d of a base 3. Because of this, a force constantly acts on the lens frame 4002 pressing it against the imaging surface 4a of the imaging element 4. Through this, a position that is parallel to the imaging surface 4a in the outer peripheral portion of the imaging surface 4a of the imaging element 4 makes surface contact with the perpendicular face 2b of the lens frame 4002, to cause the optical axis L2 of the lens group that is structured from the two lenses 1 to be perpendicular relative to the imaging surface 4a of the imaging element 4. This enables the optical axis L2 of the lens group to be set to be perpendicular to the imaging surface 4a of the imaging element 4, without adjusting the slope of the optical axis L2 of the lens group relative to the imaging surface 4a of the imaging element 4, even if there is variability in, for example, the tilt of the imaging element 4 relative to the circuit board 5.

This structure enables prevention of a negative effect on the resolution, or a reduction in guaranteed resolution in the design, in the image or video captured through imaging using the imaging device 4000, that would be caused by a tilt in the optical axis L2 of the lens group that is structured from the two lenses 1 in relation to the imaging surface 4a of the imaging element 4.

Moreover, the lens frame 4002 has a movement constraining portion 4002f for constraining movement in the direction that is perpendicular to the optical axis L1 in the design of the lens frame 4002, on the periphery of the perpendicular face 2b of the lens frame 4002. Specifically, the movement constraining portion 4002f is provided at the tip end portion of a large diameter portion 2a. Given this, as illustrated in FIG. 14, the lens frame 4002 tilts, rotating centered on the vicinity P of the center of the optical axis of the imaging element 4. This enables elimination of the misalignment of the optical axis L2 of the lens group that is structured from the two lenses 1 with the axis of the imaging element 4 on the imaging surface 4a of the imaging element 4, produced when the lens frame 4002 is tilted. This enables prevention of a negative effect on the resolution, or a reduction in guaranteed resolution in the design, for an image or video that is captured by the imaging device 4000 that would be caused by misalignment of the axis of the imaging element 4 from the optical axis L2 of the lens group on the imaging surface 4a of the imaging element 4 when the lens frame 4002 is tilted.

In Example 2, described above, the explanation was for an example wherein a portion of the electronic components 43 were disposed on the periphery of a boundary part with the facing portion 45 in the extended portion 44 of the flexible printed circuit board 40, but the arrangement of the electronic components 43 is not limited thereto. For example, the structure may be one wherein all of the electronic components 43 are disposed in the rearward region 41b of the facing location 45.

While in each of the examples described above the explanations were for examples wherein the imaging devices 1000, 2000, and 3000 were provided with lens groups that were structured from two lenses 1, the number of lenses 1 for structuring the lens group is not limited to 2. The lens group may be structured from a single lens 1, or may be structured from three or more lenses 1.

While in the various examples set forth above the explanations were for examples wherein the imaging devices 1000, 2000, and 3000 were each provided with at least one convex lens 1, the number of lenses, the materials of the lenses, and the shapes of the lenses do not matter insofar as the desired physical properties (for example, refractive index, Abbe number, partial dispersion ratio, and coefficient of linear expansion), and durability, and the like, are produced. Moreover, the lens surface of the lens 1 may be formed from a spherical surface or a flat surface, or may be formed from an aspherical surface. The case wherein the lens surface is a spherical surface or a flat surface is preferred in that this makes lens processing and assembly adjustments easy, and prevents variation in optical performance due to processing or assembly adjustment tolerance error. Moreover, if the lens surface is an aspherical surface, the aspherical surface may be formed into an aspherical surface through a grinding process, a glass molding aspherical surface wherein glass is formed into an aspherical surface shape through molding, or a complex aspherical surface wherein resin is formed into an aspherical surface shape on the surface of the glass. Moreover, the lens surface may be a diffractive surface, and the lens may of a type with a distributed refractive index (a GRIN lens), or a plastic lens.

Furthermore, in the lens surface of the lens 1, the surface of the lens unit, as necessary, may be subjected to various types of treatments. Examples of such treatments include, for example, using a photocatalyst, or the like, to cause the surface portion to be hydrophilic in order to prevent clouding of the lens unit and to prevent formation of water droplets thereon. For example, when the camera explained in Example 4 is used, it may be, for example, a treatment such as a photocatalyst, or the like, to produce hydrophilia, to prevent fogging of the lens 1 and to prevent formation of water droplets, on locations that on the lens 1 that might be exposed to the outside.

The lens frame 2 according to Example 1, described above, may be structured so that the lens will not come out of the lens frame through an external physical shock, or the like. Moreover, the shape of the lens frame 2 may be a round cylinder, may be a polygonal cylindrical body, a closed-bottom round cylinder, a closed-bottom polygonal cylindrical body, or the like.

While in Example 1, described above, the explanation was for an example wherein the lens frame 2 was pressed against the imaging element 4 by a coil compression spring 6, the lens frame 2 may be pressed against the imaging element 4 through, for example, a leaf spring or some other elastic member instead. Conversely, the structure may be one wherein the lens frame 2 is held against the imaging element 4 through a method such as thermocompression bonding or a method that uses an adhesive agent.

Moreover, if necessary, the imaging element 4 that is provided in the imaging device 1000, 2000, or 3000 of an example described above may include another member, such as, for example, a covering member such as a cover glass. Note that in the Specification and Patent Claims in the present example, the term "imaging element" is used not just for an imaging element that does not include other members, such as a covering member, but also means imaging elements that include other members, such as covering members.

The imaging devices 1000, 2000, and 3000 in the various examples set forth above, may be provided not just with a lens 1, but, if necessary, members for preventing ghosting of the image that is imaged through the imaging device, or members for adjusting the cumulative tolerance of the lens unit in the optical axial direction (the thickness of the lens unit in the optical axial direction), waterproofing members for waterproofing, and IR-cut filters.

While in Example 4, described above, the explanation was for an example of a camera 100 that incorporates any of the imaging devices 1000, 2000, or 3000 according to Examples 1 through 3, described above, the optical device that incorporates the imaging device 1000, 2000, or 3000 is not limited to being a camera. For example, it may be an electronic device such as a mobile telephone, a tablet terminal, a personal computer, or the like, wherein the imaging device 1000, 2000, or 3000 is installed. It may instead be a vehicle wherein the imaging device 1000, 2000, or 3000 is installed.

The present invention may be embodied and modified in a variety of ways without deviating from the spirit or intent of the present invention, as broadly defined. Moreover, the examples set forth above are to explain this invention, and do not limit the scope of the present invention. That is, the scope of the present invention is defined by the claims, not the examples. Moreover, various modifications carried out within the scope of meaning of the invention within the claims or equivalents thereto are considered to be within the scope of the present invention.

The invention claimed is:

1. An imaging device comprising:
    a lens group;
    a lens frame holding the lens group;
    a lens frame holding member holding the lens frame;
    an imaging element having an imaging surface;
    a substrate to which the imaging element is fixed and attached to the lens holding member, the imaging element being mounted on a first side of the substrate;
    a perpendicularity maintaining portion maintaining the optical axis of the lens group in a state that is perpendicular to the imaging surface of the imaging element through setting the position of the lens frame in relation to the imaging element; and
    a conductive member disposed on a second side of the substrate, the second side opposite to the first side, the conductive member disposed at a position that corresponds to a peripheral edge portion of the imaging element,
    wherein the lens frame comprises a main unit portion that is cylindrical, and, at one end portion in the cylinder axial direction of the main unit portion, a large-diameter portion that is perpendicular to the cylinder axis and that extends in a direction away from the cylinder axis, and the lens frame is disposed between the lens frame holding member and the substrate, wherein the lens frame holding member has a lens frame holding portion provided with an opening to which the main body portion is fitted, wherein the perpendicularity maintaining portion is disposed between an outer peripheral portion of the opening and the large diameter portion, and includes an elastic member that biases the perpendicularity surface in the optical axis direction so as to directly press the perpendicularity surface against the imaging surface.

2. The imaging device as set forth in claim 1, wherein: the lens frame comprises a main unit portion that is cylindrical, and, at one end portion in the cylinder axial direction of the main unit portion, a large-diameter portion that is perpendicular to the cylinder axis and that extends in a direction away from the cylinder axis; and the lens frame holding member comprises a lens frame holding portion that is provided with an opening portion into which the main unit portion is fitted.

3. The imaging device as set forth in claim 1, wherein: the contact maintaining portion is structured from an elastic member biasing the lens frame in the direction that presses a perpendicular face of the lens frame to the imaging surface.

4. The imaging device as set forth in claim 3, wherein: the elastic member is structured from a coil compression spring.

5. The imaging device as set forth in claim 1, wherein: the lens frame comprises a movement constraining portion, in the vicinity of a perpendicular face of the lens frame, for constraining movement of the lens frame in a direction that is perpendicular to the optical axis of the lens group.

6. An optical device comprising:
the imaging device as set forth in claim 1.

7. An electronic device comprising:
the imaging device as set forth in claim 1.

8. A vehicle comprising:
the imaging device as set forth in claim 1.

9. A method for manufacturing an imaging device as set forth in claim 1 comprising the steps of:

securing the lens group to the lens frame;

securing the lens frame to the lens frame holding member; and supporting a state wherein the optical axis of the lens group is caused to be perpendicular to the imaging surface of the imaging element through setting the position the position of the lens frame relative to the imaging element.

* * * * *